Patented July 28, 1936

2,049,286

UNITED STATES PATENT OFFICE 2,049,286

AZO DYES AND METHODS FOR THEIR PREPARATION

Crayton Knox Black, Wilmington, Del., assignor to E. I. du Pont de Nemours & Company, Wilmington, Del., a corporation of Delaware No Drawing. Application March 30, 1933, Serial No. 663,497

6 Claims. (Cl. 260—76)

This invention relates to new azo dyes and more particularly refers to disazo dyes which are especially adapted for dyeing leather in uniform shades of satisfactory fastness.

The subject matter of the present invention in its preferred form comprises dyes of the following general formula:

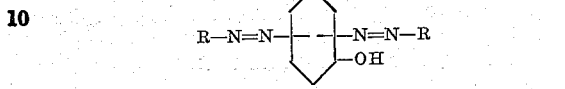

wherein one R is the radical of diazotized picramic acid and the other R is the radical of either diazotized picramic acid or diazotized aminosalicylic acid.

It is an object of this invention to produce new azo dyes which are suitable for dyeing leather, whether chrome or vegetable tanned, in uniform shades of good fastness. A further object is to produce new disazo dyes, particularly dyes which impart various shades of brown to the treated material. A still further object is to produce dyes which exhaust evenly and completely on vegetable tanned leather. Additional objects will become apparent from a consideration of the following description.

These objects are accomplished by the herein described invention which in its preferred embodiment comprises the coupling of diazotized amino-salicylic acid or diazotized picramic acid with resorcin, and the coupling of the resulting product with diazotized picramic acid.

The invention may be more completely understood by a consideration of the following illustrative examples, in which the quantities are stated in parts by weight:

Example 1

16.4 parts of diazo salicylic acid as paste were stirred in 100 parts of water until free from lumps. 11 parts of resorcin were dissolved in 100 parts of water. The diazo salicylic acid was added to the resorcin solution at 20° C. 4 parts of sodium acetate were added and the mixture stirred 15 minutes. The acidity of the combination was gradually reduced over a period of two hours by adding carefully, sodium hydroxide in solution, a total of 4 parts of sodium hydroxide being added in this way. When coupling was complete, the combination was made distinctly alkaline to brilliant yellow paper by the addition of 13 parts of sodium hydroxide. 19.9 parts of picramic acid were diazotized in the usual manner and the resulting diazo body added to the alkaline first combination, maintaining a temperature of 17° C. Coupling was very rapid. The dye was isolated by acidifying the combination with hydrochloric acid, until it was acid to litmus paper, but not to Congo red paper, and adding salt.

The dry dye was a black powder which dissolved in water to give a dark brown solution and in concentrated sulfuric acid to give a violet solution. It dyed leather a dark chocolate brown. Its probable formula is as follows:

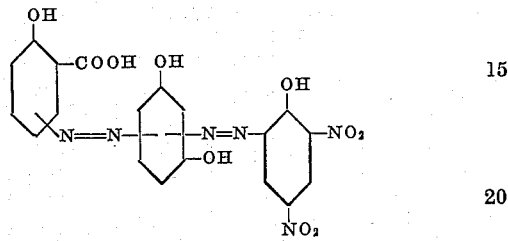

On reducing with sodium hydrosulfite the following compounds were obtained:

Amino-salicylic acid
Diamino-resorcin
2, 4, 6-Triamino-phenol

Example 2

39.8 parts of picramic acid were diazotized in the usual manner by the addition of hydrochloric acid and sodium nitrite at 17° C. The resulting diazo body was added to a solution of 11 parts of resorcin and 16 parts of sodium hydroxide in 200 parts of water 20° C. When coupling was complete the dye was isolated as in Example 1.

The dry dye was a black powder which dissolved in water to give a reddish-brown solution and in concentrated sulfuric acid to give a red solution. It dyed leather a reddish-brown. Its probable formula is as follows:

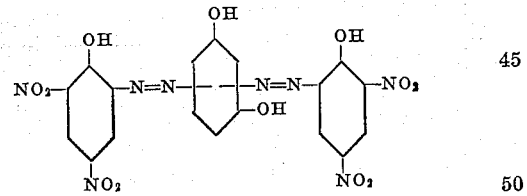

On reducing with sodium hydrosulfite the following compounds were obtained:

Diamino-resorcin
2, 4, 6-Triamino-phenol

Example 3

24.6 parts of diazo salicylic acid were substituted for the 16.4 parts of diazo salicylic acid and 9.95 parts of picramic acid substituted for the 19.9 parts of picramic acid in Example 1.

The dry dye was a black powder which dissolved in water to give a brown solution and in concentrated sulfuric acid to give a red solution. It dyed leather a brown, yellower in shade than the dye of Example 1. Its probable formula is a mixture of the dyes cited in Examples 1 and 3.

On reducing with sodium hydrosulfite the following compounds were obtained:

Amino-salicylic acid
Diamino-resorcin
2,4,6-Triamino-phenol

Example 4

8.2 parts of diazo salicylic acid were substituted for the 16.4 parts of diazo salicylic acid and 29.85 parts of picramic acid substituted for the 19.9 parts of picramic acid in Example 1.

The dry dye was a black powder which dissolved in water to give a brown solution and in concentrated sulfuric acid to give a red solution. It dyed leather a brown, redder in shade than the dye of Example 1. Its probable formula is a mixture of the dyes cited in Examples 1 and 2.

On reducing with sodium hydrosulfite the following compounds were obtained:

Amino-salicylic acid
Diamino-resorcin
2,4,6-Triamino-phenol

It is to be understood that the processes previously described for purposes of illustration may be subjected to wide variation and modification in the manner of their practical application. For example, the temperatures and times of reaction may be varied within rather wide limits without departing from the scope of the present invention. Furthermore, in producing mixtures of the compounds according to Examples 3 and 4, the proportions of diazo salts used may be varied from practically equivalent amounts to extremes wherein the amount of one salt is almost negligible in comparison with the amount of the other salt. Likewise, in place of producing the mixture of disazo dyes in the aforementioned manner, they may be produced separately and the individual dyes mixed in any desired proportion.

One or both of the end components of these dyes may have substituted thereon one or more groups such as alkyl, alkoxy, nitro, halogen, hydroxy, and carboxylic and sulfonic acid without departing from the scope of the present invention. Satisfactory results have also been obtained by substituting on the middle component alkyl, alkoxy, nitro, halogen, hydroxy and sulfonic acid groups. Of course, it is to be understood that these groups must not be substituted in such a manner as to prevent coupling from taking place. Although these further substituted components are capable of use according to the present invention, the selection of unsubstituted amino-salicylic acid, picramic acid and resorcin is usually preferred.

The compounds disclosed herein are particularly adapted for dyeing leather in attractive and desirable shades of brown, which formerly could be obtained only by the use of mixtures of dyes. These colors are exceptionally fast and exhaust well. In addition to the dyeing of leather they are suitable for dyeing other materials, for instance wool.

As many apparently widely different embodiments of this invention may be made without departing from the spirit and scope thereof, it is to be understood that I do not limit myself to the specific embodiments thereof except as defined in the appended claims.

I claim:

1. An azo dye having the formula:

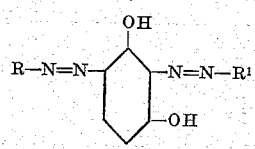

in which R is the radical of diazotized picramic acid and in which R¹ is a member of the group consisting of the radical of diazotized picramic acid and the radical of diazotized amino-salicylic acid.

2. An azo dye having the formula:

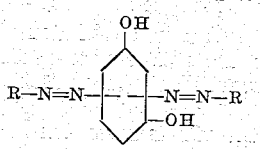

in which R is the radical of diazotized picramic acid.

3. An azo dye having the formula:

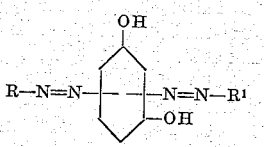

in which R is the radical of diazotized picramic acid and in which R¹ is the radical of diazotized amino-salicylic acid.

4. A process for producing an azo dye which comprises coupling diazotized picramic acid with resorcin, and coupling one of a group consisting of diazotized picramic acid and diazotized amino-salicylic acid with the resulting compound.

5. The method of producing an azo dye which comprises coupling diazotized picramic acid with resorcin and coupling the resulting compound with diazotized picramic acid.

6. The method of producing a dyestuff which comprises coupling resorcin with diazotized picramic acid and coupling the resulting compound with diazotized amino-salicylic acid.

CRAYTON K. BLACK.